United States Patent [19]
Stephenson et al.

[11] Patent Number: 5,875,385
[45] Date of Patent: Feb. 23, 1999

[54] METHOD FOR THE CONTROL OF THE COMPOSITION AND PHYSICAL PROPERTIES OF SOLID URANIUM OXIDES

[75] Inventors: Michael J. Stephenson, Oak Ridge; Paul A. Haas, Knoxville; Robert S. Eby, Oak Ridge, all of Tenn.

[73] Assignee: Molten Metal Technology, Inc., Fall River, Mass.

[21] Appl. No.: 783,264

[22] Filed: Jan. 15, 1997

[51] Int. Cl.⁶ ................................................ C01G 43/01
[52] U.S. Cl. ........................................ 423/260; 423/261
[58] Field of Search ................... 423/258, 260, 423/261

[56] References Cited

U.S. PATENT DOCUMENTS

| | | | |
|---|---|---|---|
| 3,260,575 | 7/1966 | Heestand et al. | |
| 3,906,081 | 9/1975 | Welty | 423/261 |
| 3,970,581 | 7/1976 | Jeter et al. | 423/260 |
| 4,005,042 | 1/1977 | Dada | 423/260 |
| 4,031,029 | 6/1977 | Colter et al. | 423/260 |
| 4,090,976 | 5/1978 | DeHollander et al. | 423/261 |
| 4,698,214 | 10/1987 | Linz et al. | 423/260 |
| 4,830,841 | 5/1989 | Urza. | |

OTHER PUBLICATIONS

Richard L. Heestand, Thermal Chemical Reduction of Uranium Hexafluoride for the Direct Fabrication of Uranium Dioxide Ceramic Fuels, Dec. 1965, pp. 584–588, 1(6), Nuclear Applications Irvin E. Knudsen, Engineering Development of Fluidized–Bed Fluoride Volatility Processes, ANL–6902, p. 1, Dec. 1964.

*Primary Examiner*—Ngoclan Mai
*Attorney, Agent, or Firm*—Robert M. Poteat

[57] ABSTRACT

The present invention provides a method for varying and controlling the chemical composition and physical properties of the uranium oxide solids produced by the thermal conversion of $UF_6$. The method allows the production of predominantly $UO_2$, $U_3O_8$, or $UO_3$ interchangeably from the same reactor simply by controlling the hydrogen and oxygen contents of the feed relative to uranium. The temperature profile of the thermal reactor is established by specifying the preheat of the feed prior to mixing, the feed composition, and the reactor wall temperature to thus vary and control the physical properties of the resulting solids according to the end use of the uranium product.

20 Claims, 1 Drawing Sheet

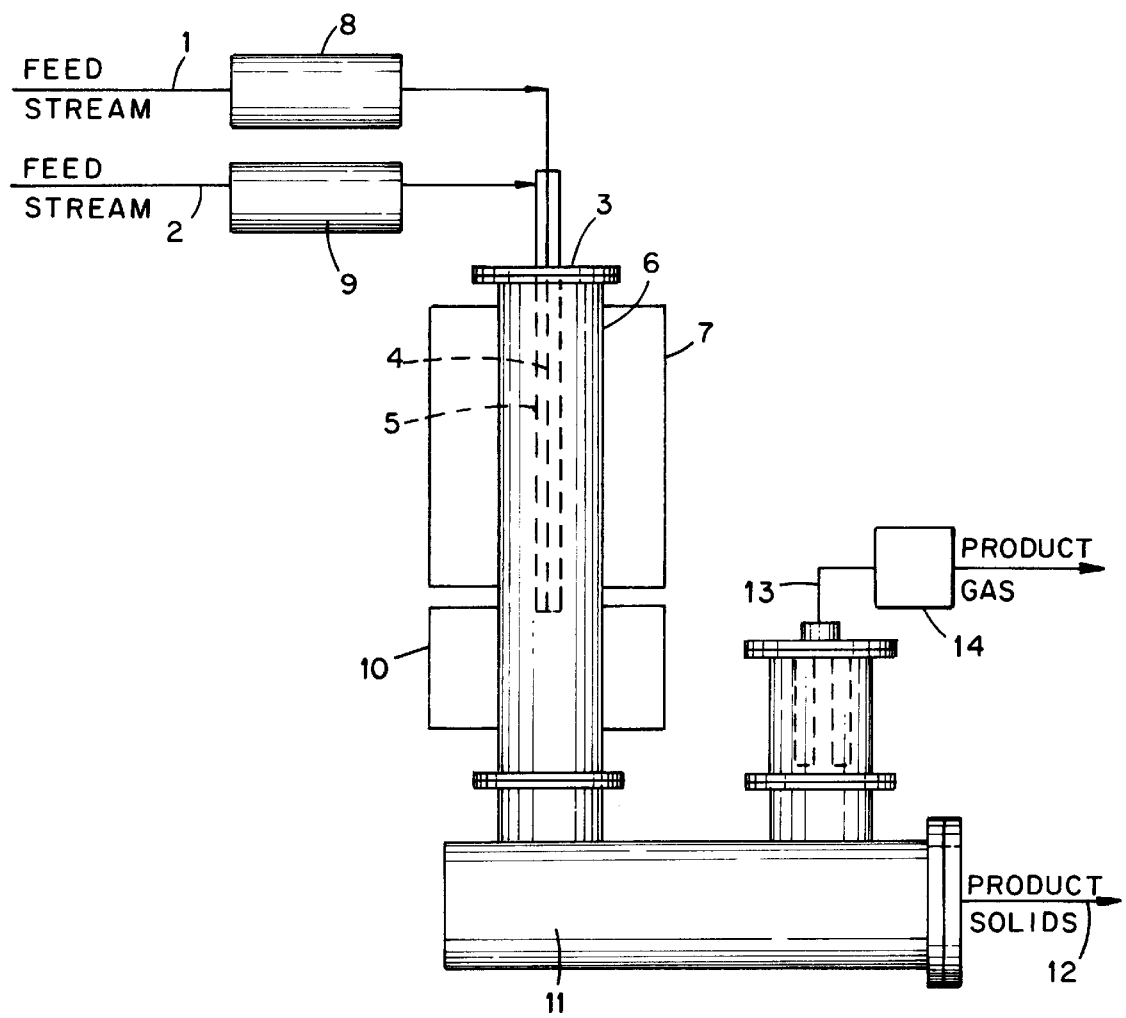

METHOD FOR THE CONTROL OF THE COMPOSITION AND PHYSICAL PROPERTIES OF SOLID URANIUM OXIDES

FIELD OF THE INVENTION

The present invention is useful to control the chemical and physical properties of the uranium oxide products from a high temperature thermal reactor for the dry conversion of uranium hexafluoride ($UF_6$). The thermal process for conversion of $UF_6$ to uranium oxides is described in U.S. application Ser. No. 08/635,190 entitled "Thermal Process for the Conversion of Uranium Hexafluoride." This patent was filed Apr. 19, 1996, in the names of Michael J Stephenson, et al., the contents of which are incorporated herein by reference, and is assigned to the same assignee as the present invention. The present invention provides an efficient and cost effective method for the production of multiple uranium oxides, including $UO_2$, $U_3O_8$, or $UO_3$, interchangeably from the same reactor simply by controlling the hydrogen and oxygen contents of the feed relative to uranium. This invention, also, permits the tailoring of uranium oxides with specific properties for special uses, such as high density aggregate for concrete-type radiation shielding or for addition to spent nuclear fuel storage containers.

BACKGROUND TO THE INVENTION

Traditional conversion of $UF_6$ involves one or more hydrolysis and reduction reactions utilizing oxygen and hydrogen bearing compounds. Experience shows that the conversion pathways are not straightforward and involve multiple intermediate uranium compounds. Hence, one step conversions involving multiple reactants, as shown by one of the following familiar reactions, are unlikely:

$$UF_6+3H_2+O_2 \rightarrow UO_2+6HF \quad (1)$$

and

$$UF_6+2H_2O+H_2 \rightarrow UO_2+6HF \quad (2)$$

The most commonly observed uranium intermediates generated by traditional conversion technologies are $UF_4$ and $UO_2F_2$ as shown by the following pairs of reactions:

$$UF_6+H_2 \rightarrow UF_4+2HF \quad (3)$$

$$UF_4+2H_2O \rightarrow UO_2+4HF \quad (4)$$

and

$$UF_6+2H_2O \rightarrow UO_2F_2+4HF \quad (5)$$

$$UO_2F_2+H_2 \rightarrow UO_2+2HF \quad (6)$$

or

$$UO_2F_2+H_2O \rightarrow \tfrac{1}{3}U_3O_8+\tfrac{1}{6}O_2+2HF \quad (7)$$

Other reaction scenarios include $UF_5$, $UOF_2$, and $UOF_4$. Uranium intermediates that the overall efficiency of the conversion process and largely determine the overall requirements and conditions for achieving the final uranium oxide product. For example, reactions (3) and (5) are rapid and unambiguous. On the other hand, reactions (4), (6), and (7) are traditionally slow and difficult to drive to completion without higher temperatures and large stoichiometric excesses of $H_2$ and $H_2O$. It is well known by those skilled in the art that uranium intermediates also largely establish the physical properties of the final uranium oxide product.

The conversion of $UF_6$ to $UO_2$ has generally been pursued mainly by companies in the nuclear fuel business. For the most part, existing processes emphasize low-to-moderate operating temperatures with equipment designed to prepare chemically reactive $UO_2$ suitable for a specific applications, i.e., the production of ceramic-grade $UO_2$ for the fabrication of nuclear fuel. In most cases, uranium intermediates are deliberately formed via reactions (3) and (5), above, at relatively low temperatures, i.e., 200°–300° C. and the intermediates subsequently reacted in a second reactor via reactions (4) and (6), above, at moderate temperatures, i.e., 500°–700° C. These processes require large excesses of water and hydrogen to drive the reaction to completion. Moreover, even with the large stoichiometric excesses, extended processing times—on the order of hours—are required to bring about a reasonably high conversion efficiency of the intermediate to final product.

Representative of the numerous U.S. patents directed toward processes for the dry conversion of $UF_6$ to uranium oxides is, for example, U.S. Pat. No. 4,830,841 and the U.S. patents listed therein. These patents describe processes for converting $UF_6$ to uranium dioxide in furnaces, rotary kilns, fluidized beds or the like.

It is noted that U.S. Pat. No. 4,830,841 is concerned with a multiple step process for preparing $UO_2$ from $UF_6$ by reacting $UF_6$ with steam to produce submicron uranyl fluoride powder, fluidizing a bed of uranium oxide material with a mixture of steam, hydrogen, and inert gas at about 580° C. to about 700° C. Thereafter, the submicron uranyl fluoride powder is introduced into the fluidized bed of uranium oxide material so that the uranyl fluoride powder is agglomerated, densified, fluidized, defluorinated, and reduced to a fluoride-containing uranium oxide material which is removed from the fluidized bed. Lastly, the fluoride-containing uranium oxide material is then contacted with additional hydrogen and steam at elevated temperature to obtain $UO_2$ essentially free of fluorine.

In another prior art process, described in U.S. Pat. No. 3,260,575 entitled "Single Step Process for Preparation of Uranium Dioxide from Uranium Hexafluoride," a single step thermochemical process for the direct conversion of $UF_6$ to a high density refractory $UO_2$ fuel is described. This process requires reacting the $UF_6$ with $H_2O$ and $H_2O$ at a very low pressure (~10 torr) on a hot surface, typically an $Al_2O_3$ tube, maintained at 1200°–1500° C. in a resistance heated furnace to produce $UO_2$. While this process deposited $UO_2$ product as sub-micron powder, dendritic crystallites, and solid approaching theoretical density, it required extremely large excesses of water (20–30 times stoichiometric). Reduced pressure, diluent gases, and controlled feed configurations were required to prevent condensation of undesired intermediate uranium solids. Only $UO_2$ was produced and the physical properties of the solids were not controlled. Also, it was difficult to recover the solids from the experimental system from the inside of the ceramic tube where they were formed. See also Nuclear Applications 1 (6), pp 584–588, December 1965.

In another process, a single fluidized bed reactor was demonstrated for the preparation of dense spherical $UO_2$ particles from $UF_6$ utilizing a cyclic mode to perform two discreet chemical unit operations. Unlike the low-temperature hydrolysis process for converting $UF_6$ to $UO_2$, the conversion reactor was operated at higher temperatures, e.g., 650°–700° C. to avoid the formation of undesirable $UO_2F_2$, forming uranium products of $UF_4$ and $U_3O_8$. Thereafter, the intermediates were reacted with additional quantities of steam and $H_2$ (with the $UF_6$ flow discontinued) to form only $UO_2$. Variation of the steam/$UF_6$ molar ratio was observed to produce changes in the relative proportions of $UF_4$ and $U_3O_8$ formed during the $UF_6$ feed period. While the cyclic process is simpler than the traditional $UF_6$ conversion approaches, it is not normally efficient and is not generally preferred over a continuous process. See ANL-6902, I. E. Knudsen, et al, December, 1964.

None of these prior art processes or technologies provide for a single dry process that directly produces super-dense $UO_2$, $U_3O_8$, or $UO_3$ and allows for the production of uranium oxide particulates of variable physical properties to enhance the industrial viability of the uranium oxide product or make a more environmentally stable uranium product for long term storage or permanent disposal. It is therefore a primary object of the present invention to provide such a process. Other objects of the present invention will become apparent to a person skilled in the art from a reading of the following preferred embodiments and appended claims and by reference to the accompanying drawing described hereinafter.

SUMMARY OF THE INVENTION

The present invention is a method for controlling the composition and the physical properties of uranium oxide solids formed in a high temperature chemical reactor for the conversion of $UF_6$. It has been found, quite unexpectedly, that uranium oxides, i.e., $UO_2$, $U_3O_8$, and $UO_3$, can readily be formed in a dry thermal $UF_6$ conversion process with varying physical properties by controlling the temperature profile of the chemical reactor for preselected feed compositions that favor the formation of a particular uranium oxide.

The operation of the thermal reactor is maintained and controlled with the specification of and control of multiple but discreet interrelated reactor parameters. Chemical and physical properties have been found to be linked, in the present invention, to the reactor operation in an unconventional and complex manner that is not understood because of the formation of and subsequent reaction on of various uranium intermediate compounds. Composition of and preheating of the reactant feed streams offer the primary controls of the present invention. Other parameters include the reactor temperature, pressure, and residence time.

The feed composition to the thermal reactor is established according to total hydrogen/uranium (H/U) and total oxygen/uranium (O/U) molar ratios required to yield a particular uranium oxide product. Sufficient hydrogen, normally H/U>6, is added to react the total fluorine content of the feed to HF. Sufficient oxygen is added, preferably as $O_2$, and an oxygen in a combined form, such as $H_2O$ and $CO_2$, to form the desired uranium oxide. Excess hydrogen favors the formation of $UO_2$, while excess oxygen favors $U_3O_8$ and $UO_3$.

Equally important to the thermal process of the present invention is the addition of sufficient heat to ensure a minimum feed gas preheat temperature prior to mixing of the reactant gases. Additionally, as part of controlling the temperature profile of the chemical reactor, a minimum uranium product temperature is necessary. Preferably, uranium product temperatures should be maintained in the range of 900° to 1500° C. On the other hand, care has to be excersied to ensure that the maximum service temperature of the reactor system materials of construction are not exceeded.

According to the present method, heat may be added to the process by one or more mechanisms: (1) preheat of the feed gas before mixing, (2) addition of some fraction of the conversion oxygen requirement as $O_2$, instead of only $H_2O$ or $CO_2$ to increase the heat of reaction, and (3) heating/cooling of the reactor walls.

Residence time is controlled in accordance with the present invention by varying reactor cross section with total gas flow to achieve certain average gas velocities in the feed tubes and reactor. Normally, residence times of 0.1 to 1 second are established by design and operation of the thermal reactor to ensure thermodynamic equilibrium.

Reactor pressure is the final control used in the present invention to control the chemical and physical properties of the uranium product. Generally, a lower pressure is selected to shift the thermodynamic equilibrium to favor oxide solids with lower fluorine content.

BRIEF DESCRIPTION OF THE DRAWING

The invention is further described by reference to the accompanying drawing wherein a flow diagram is given to show one arrangement for practicing the control invention. Two gaseous reactant streams (1) and (2) are fed continuously to a reactor feed apparatus (3) comprising a pair of concentric feed tubes (4) and (5) positioned within the reaction vessel (6). A gaseous mixture of $UF_6$ and $O_2$, optionally including an inert gas such as Ar or $N_2$, is fed through the inner tube (4) while a gaseous mixture of $H_2$, $NH_3$, and/or $CH_4$ and $H_2O$ or $CO_2$, optionally with inert gas such as Ar or $N_2$, is fed through the outer tube (5).

Individual component flows that comprise streams (1) and (2) are varied and controlled individually by flow control devices (not shown) to yield the specific stoichiometry for a desired product. Gaseous feeds are heated by a variety or combination of means, such as by an external electrical heating source (7) on vessel (6) or by external gas heater exchangers (8) and (9) positioned in streams (1) and (2) prior to feed tubes (4) and (5). Reaction heat is supplied by the chemical combination of streams (1) and (2) at the discharge of feed tubes (4) and (5) inside the reaction vessel (6). Additional heat is provided to the reaction zone by external means (10) on the wall of reactor (6). The reaction products discharge into the collection pot (11) located under reactor (6) which is preferably provided with means to facilitate separate discharge of a uranium oxide solids stream (12) and HF gaseous stream (13). The pressure of reactor (6) is controlled by pressure control device (14) located in stream (13).

DESCRIPTION OF THE PREFERRED EMBODIMENTS

The primary process parameters actively controlled to vary the chemical and physical properties of the uranium oxide products include:

1) Hydrogen to Uranium (H/U) Molar Feed Ratio

Higher H/U molar feed ratios favor a more complete and faster formation of HF. H/U ratios above 6 give nearly complete conversion of feed fluorine to HF if the other process conditions are favorable. Ratios less than 6 will leave increasing amounts of $UF_4$ or $UO_2F_2$ in the solids.

2) Oxygen to Uranium (O/U) Molar Feed Ratio

Higher O/U ratios favor a more complete and faster conversion of $UF_6$ into uranium oxides but only if the H/U ratio is >6 to allow complete conversion of fluorides to HF.

3) Excess Oxygen Versus Excess Hydrogen in the Product

After formation of $UO_2$ (which requires O/U=2) and HF (which requires H/U=6), any additional amounts of oxygen combines first with hydrogen and carbon to form $H_2O$ and CO, and then with $UO_2$ to form the higher uranium oxides (e.g., $U_4O_9$, $U_3O_8$, and $UO_3$).

4) Reactor Temperature Profile

The temperatures at which the conversion reactions take place have major effects on the equilibrium compositions and the rates of reaction. Rates of reaction generally increase as the temperature increases. The initial reactions proceed essentially at the mixing temperature of the feed gases. Subsequent reactions proceed at the generally higher temperatures brought about by the reaction heat generated by the initial reactions. The thermodynamic equilibrium compositions show essentially complete conversion of $UF_6$ into uranium oxides at 900° to 1500° C. As the temperature is decreased below this optimum range, the equilibrium compositions show rapidly increasing amounts of $UF_4$ or $UO_2F_2$ solids. Lower reaction temperatures, on the other hand, favor the formation of more reactive solids with higher surface areas. Higher reaction temperatures favor the formation of less reactive solids with correspondingly lower surface areas. The thermal reactor temperature profile is established in three ways that interact in a complex manner:

a) The feeds are preheated before mixing to assure minimum reaction temperatures that give favorable equilibrium compositions.

b) The heats of reaction are varied and controlled by varying and controlling the division of feed between $H_2O$ vapor and ($2H_2+O_2$). This division is most commonly selected to give an exothermic reaction to increase the reactor zone and product temperatures above the preheat temperature.

c) The reactor wall temperature is controlled by heating or cooling to allow reaction at favorable temperatures without material failures from overheating.

The physical characteristics of the final product are varied and controlled within broad limits with specification of the overall temperature profile of the thermal process.

5) Residence Time

The thermal conversion reactions are rapid but the short holdup times of 0.1 to 1 seconds limit the approach to equilibrium compositions. Therefore, the final product compositions can be varied with reactor holdup times. Increasing residence time increases the degree of solids product agglomeration and sintering.

6) Reactor Pressure

The thermodynamic equilibrium composition of the final product is sensitive to the system pressure. The fluoride of the resulting uranium oxide is decreased by reducing the conversion reactor pressure. Controlled back-reactions during uranium product cool down before separation of the HF product from the oxide product can also be used to change the final product composition.

The uranium oxide solids have a number of potential uses or disposal options. Each of these has preferred compositions and properties. For example, use of the resulting oxide in radiation shielding requires the production of more reactive, higher surface area $UO_2$ particulates that can be hot pressed and sintered into high density aggregates for incorporation in concrete and other rigid matrices. On the other hand, disposal of depleted uranium from the isotopic enrichment industry requires the most environmentally stable uranium form, generally recognized as $U_3O_8$, with lower particulate surface area to better resist leaching by ground water. Further, it is desirable to produce the most dense oxide to reduce disposal volume. Advantageously, the present integrated thermal $UF_6$ conversion process, which can vary and control the composition and properties of the final uranium solids over a broad range, has more application and is more useful to the industry than a conversion process that can produce only a single product line.

Preferably the feed stream comprising $UF_6$ contains at least part of the oxygen needed for the conversion of $UF_6$ to oxide, the balance of the oxygen being included in a second feed stream. The oxygen in the $UF_6$ feed stream should only be in the form of $O_2$ to avoid the potential for premature reaction of the $UF_6$. It is also preferred that the $UF_6$ feed stream does not contain $H_2$.

The hydrogen in the second reactant stream can be in the form of $H_2$ or as a hydrogen-containing compound such as $H_2O$, $NH_3$, and/or $CH_4$. Preferably all of the hydrogen needed for the conversion of $UF_6$ is in the second feed stream. Desirably, the second feed stream comprises a mixture of $H_2$ and $H_2O$ or a mixture of $H_2$ and $CO_2$.

While the composition of each gaseous reactant stream can be varied, care must be taken in preparing each stream to avoid the possibility of creating an explosion potential or premature reaction. For example, undesirable mixtures include $H_2$ and $O_2$, $UF_6$ and $H_2O$, $UF_6$ and $H_2$, $NH_3$ and $O_2$, and $CH_4$ and $O_2$. One or both feed streams may also include an inert gas such as argon or nitrogen.

Feed gas composition, feed gas preheat, and reactor wall temperature can be independently varied or controlled such that $UF_6$ conversion is carried out over a relatively wide temperature range such as between 900° C. to 1500° C. or higher, e.g., up to 2000° C., with a resulting final product temperature of around 1100° C. being generally preferred. The temperature profile of the integrated thermal process starting with preheat of the feed gases and ending with the temperature of the oxide product is controlled by the subject invention. Incremental temperature control of the initial reactants, intermediates, and final products are a key feature of the subject invention.

Advantageously, the reactant streams are fed into the thermal reactor to obtain intimate mixing of preheated reactants such as through a concentric feed tube device, with the $UF_6$ gas or $UF_6+O_2$ gas mixture being fed through, for example, the inner tube and the other gaseous reactant stream being fed through an outer tube. The feed tubes can be appropriately heated by external means such as a resistance furnace to achieve the desired feed gas preheat temperature. With appropriate selection of the composition of the reactant gas streams, in addition to the feed gas preheat and reactor wall heat, an equilibrium reaction temperature of around 900° to 2000° C. is readily attained.

Preferably, the $O_2$ and $H_2O$ and/or other oxygen-containing compounds in the feed gas collectively supply a slight excess, e.g., 10 to 50 percent over the stoichiometric amount, of oxygen over that needed to form a particular uranium oxide, such as $UO_2$, $U_3O_8$, or $UO_3$. The $H_2O$ and/or other hydrogen-containing compounds collectively supply a slight excess, e.g., 10 to 50 percent over the stoichiometric amount, of hydrogen over that needed to form HF from the fluorine contained in the feed $UF_6$. The excess of oxygen forms CO if carbon is present and $H_2O$ if excess hydrogen is present. While a stoichiometric excess of hydrogen and/or oxygen is generally preferred, it is recognized that sub-stoichiometric amounts of hydrogen and oxygen can also be used to provide a different uranium product.

The reaction can be carried out over a relatively broad pressure range such as between atmospheric and 250 psig. It may be useful in some cases to operate substantially below subatmospheric, possibly less than 2 psia (e.g., <100 torr) to minimize the residual fluoride content of the uranium oxide product.

The invention is illustrated by the following examples:

EXAMPLE 1

A chemical reactor for the high temperature conversion of $UF_6$ gas into uranium oxides and HF was fed as follows: the feed apparatus was assembled using a 0.5 inch O.D. by 48 inches long $Al_2O_3$ tube contained in a 1 inch O.D. by 40 inches long $Al_2O_3$ tube. Both ceramic feed tubes were positioned in a 3 inch Sch 10 Inconel pipe reactor with top flange and tubing fittings for securing the feed tubes. The reactor assembly was contained in a resistance heated tube furnace operated at 900° C. The feed flow to the inner tube was 212 sccm $UF_6$ and 2000 sccm Ar. The feed flow to the annulus was 470 sccm $H_2$, 550 sccm $H_2O$, and 1000 sccm Ar, yielding a process feed H/U ratio of 9.6 and O/U ratio of 2.6. The predominant uranium product was $UO_2$. The average $UO_2$ particle size was 3.50 microns and the surface area was 0.76 $m^2$/g. The bulk density of the product was 2.90 g/cc.

This example shows a typical operation of the present invention to provide a $UO_2$ product under nominal process conditions.

EXAMPLE 2

The same chemical reactor described in Example 1 was used to convert $UF_6$ to uranium oxides, except (1) the feed flow to the inner tube was 212 sccm $UF_6$, 45 sccm $O_2$, and 2000 sccm Ar, and (2) the feed flow to the annulus was 550 sccm $H_2$, 470 sccm $H_2O$, and 1000 sccm Ar, yielding a process feed H/U ratio of 9.6 and an O/U ratio of 2.6 (identical process chemistry to Example 1). Sixteen percent (16%) of the oxygen requirement in this case was fulfilled with $O_2$ (45 sccm $O_2$ added to the $UF_6$ feed). The predominant uranium product was $UO_2$ as determined by X-ray diffraction. The average $UO_2$ particle size was 5.08 microns and the surface area was 0.58 $m^2$/g. The bulk density of the product was 2.91 g/cc.

This example, by comparison to Example 1, shows the effects of supplying part (e.g., 16%) of the oxygen requirement as $O_2$, with the balance of the oxygen requirement supplied as $H_2O$. The extra reaction heat resulting from the burning of $H_2$ with $O_2$, in this case, yielded a significantly higher reaction product temperature than Example 1. The effect of the higher reaction temperature is manifested primarily in a more sintered particulate solid (lower surface area) and agglomerated solid product (larger average particle size).

EXAMPLE 3

The same chemical reactor used in examples 1 and 2 was operated with the following feed flows: the flow to the inner tube was 212 sccm $UF_6$, 255 sccm $O_2$, and 2000 sccm Ar and the flow to the annulus was 320 sccm $H_2$, 510 sccm $H_2O$, and 1000 sccm Ar. The process feed H/U ratio was 7.8 and the O/U ratio was 4.8 in this case. Fifty percent (50%) of the oxygen requirement was fulfilled with $O_2$ (255 sccm $O_2$ added to the $UF_6$ feed). The predominant uranium product was $U_3O_8$ as determined by X-ray diffraction. The average $U_3O_8$ particle size was 1.33 microns and the surface area was 2.04 $m^2$/g. The bulk density of the product was 2.61 g/cc.

This example shows how the chemical composition of the final product can be changed by simply altering the feed gas H/U and O/U molar ratios. Part of the oxygen requirement was provided by $O_2$, since the overall reaction is normally endothermic and extra heat was needed to raise the reaction product temperature to the target range of ~1200° C. In this case, using $O_2$ control, maximum service temperature of the alumina feed tube for the $UF_6$ stream (~1000° C.) was not exceeded in order to achieve the final product temperature.

What is claimed is:

1. A method for controlling the composition and physical properties of uranium oxides formed in a high temperature chemical reactor having a reaction zone for the dry thermal conversion of $UF_6$ comprising the steps of:
   1) preheating gaseous reactant streams necessary for the conversion of $UF_6$ to uranium oxides and HF comprising two or more gas streams wherein at least one of the streams is preheated to a temperature of 700°–1000° C. including
      a) a first stream formed of a gaseous mixture of $UF_6$ and $O_2$, and
      b) a second stream formed of a combination of gases containing hydrogen selected from the group consisting of $H_2$, $H_2O$, $NH_3$ and $CH_4$ and oxygen in a combined form selected from the group consisting of $H_2O$ and $CO_2$;
   said reactant streams being of a preselected feed composition for control of reaction heat and to favor the formation of predominately one of said uranium oxides;
   2) then mixing said heated streams; and
   3) injecting the mixed reactant streams directly into said reaction zone while maintaining the temperature and pressure to optimally produce one of said uranium oxides with the desired physical properties.

2. The method of claim 1 wherein said preselected feed composition is selected to provide an excess of $H_2$ in the reactor off-gas to thereby produce predominately $UO_2$ and said temperature profile of said reactor is within the range of 700° to 1100° C.

3. The method of claim 2 wherein said hydrogen is provided in a feed atom ratio to uranium (H/U) of at least 6 to 1 and said oxygen is provided in a feed atom ratio to uranium (O/U) of approximately 2 to 1.

4. The method of claim 1 wherein said temperature profile of said reactor is 800° to 1500° C. to produce a more sintered and less reactive product.

5. The method of claim 1 wherein said preselected feed composition is selected to provide an excess of $O_2$ in the reactor off-gas to thereby produce predominately $U_3O_8$ and said temperature profile of said reactor is maintained within the range of 900° to 1100° C.

6. The method of claim 5 wherein said oxygen is provided in a feed atom ratio to uranium (U/O) of approximately 3 to 1 and said hydrogen is provided in a feed ratio to uranium (H/U) of approximately 6 to 1.

7. The method of claim 1 wherein said temperature of said reactor is 800° to 1500° C. to produce a more sintered and less reactive product.

8. The method of claim 1 wherein said preselected feed composition is selected to provide an excess of $O_2$ in the reactor off-gas to thereby favor the production of $UO_3$ and said temperature profile of said reactor is maintained within the range of 600° to 900° C.

9. The method of claim 2 wherein said oxygen is provided in a feed ratio to uranium (O/U) of at least 3 to 1 and said hydrogen is provided in a feed atom ratio to uranium (H/U) of approximately 6 to 1.

10. The method of claim 1 is carried out wherein the temperature profile of the integrated thermal reactor is varied primarily by controlling the temperature of the preheater feed gas, the heat of reaction, and the temperature of the reactor wall to produce uranium oxides having preselected physical properties.

11. The method of claim 8 wherein a fraction of the stoichiometric oxygen requirement is provided with $O_2$ to increase the heat of reaction and the maximum temperature of the product.

12. The method of claim 8 wherein said temperature profile is controlled by varying the inert gas content of the feed gas.

13. The method of claim 8 wherein said temperature profile is controlled by varying the total pressure of the reactor.

14. The method of claim 8 wherein said temperature profile is controlled by varying the residence time in the reaction zone.

15. The method of claim 1 wherein the pressure of the reactor is varied and controlled to establish and maintain the fluorine content of the final uranium oxide product.

16. The method of claim 15 wherein the pressure of the reactor is reduced to lower the fluoride content of the final uranium oxide product.

17. The method of claim 16 wherein the reactor pressure is reduced to less than 100 torr to minimize the fluoride content of the final uranium oxide product.

18. The method of claim 1 wherein an effective amount of fluoride is left in the uranium solid by control of the feed composition and/or reaction temperature to facilitate compaction and sintering of the final uranium oxide product to higher densities.

19. The method of claim 18 wherein the feed H/U atom ratio near or slightly below the stoichiometric requirement of 6 is used to increase the amount of $UF_4$ in the uranium solids to increase solid product density.

20. The method of claim 18 wherein the feed O/U atom ratio near or slightly below the stoichiometric ratio of 2 is used to increase the amounts of $UF_4$ in the uranium solids.

* * * * *